United States Patent [19]

Greene

[11] Patent Number: 4,588,211

[45] Date of Patent: May 13, 1986

[54] MACHINE READABLE DOCUMENT

[76] Inventor: Edwin B. Greene, P.O. Box 732, Greenbelt, Md. 20770

[21] Appl. No.: 598,110

[22] Filed: Apr. 9, 1984

Related U.S. Application Data

[63] Continuation-in-part of Ser. No. 552,859, Nov. 17, 1983, which is a continuation-in-part of Ser. No. 277,015, Jun. 24, 1981, abandoned.

[51] Int. Cl.⁴ ............................................. B42D 15/00
[52] U.S. Cl. ...................................... 283/70; 283/57; 283/58; 283/901; 235/468
[58] Field of Search ..................... 235/468; 283/57, 58, 283/59, 1 R, 70, 74, 89, 90, 62, 901

[56] References Cited

U.S. PATENT DOCUMENTS 3,169,186  2/1965  Howard ........................... 235/468 X

OTHER PUBLICATIONS

IBM Technical Disclosure Bulletin, vol. 4, No. 12, May 1962, Lasky, D. J.

Primary Examiner—Paul A. Bell
Attorney, Agent, or Firm—John J. Byrne; Bradford E. Kile; Kevin M. O'Brien

[57] ABSTRACT

A machine readable document is disclosed with unknown variable data of a specified nature imprinted thereon in unknown, variable locations. The data is imprinted on the document in such a manner that it can be machine located, accurately read, and identified as to type for further use in creating a composite record. In one embodiment, the document is a negotiable instrument or bank check which can be machine read and used in the production of a composite image statement.

13 Claims, 5 Drawing Figures

BANK

MR. JOHN SMITH
1234 MAIN STREET
ANYTOWN, U.S.A. 00000

STATEMENT OF YOUR ACCOUNT

| ACCOUNT NUMBER | 27396-1726 |
|---|---|
| BALANCE AS OF 3-05 | 622.49 |
| ITEMS PAID 20 | 1,093.03 |
| ITEMS DEPOSITED 4 | 1,190.12 |
| SERVICE CHARGE TO DATE | 2.20 |
| BALANCE AS OF 04-05 | 717.38 |

| CHECK # | PROCESS DATE | PAY TO THE ORDER OF | AMOUNT | AMOUNT | REF. # | DATE | −DEBIT +CREDIT | BALANCE |
|---|---|---|---|---|---|---|---|---|
| | | | | | | 03-05 | OPEN BAL | 622.49 |
| 217 | | Rege | $32.18 | 32.18 | 071134296 | 03-06 | −32.18 | 590.31 |
| 218 | | W&L Co. | $47.53 | 47.53 | 068047724 | 03-07 | −47.53 | 544.78 |
| 219 | | Woolard & Lathrup | $ ~ | ~ | ~ | ~ | ~ | ~ |
| 220 | | DMH Mueschke | $ ~ | ~ | ~ | ~ | ~ | ~ |
| 221 | | Sears & Roebuck | $ ~ | ~ | ~ | ~ | ~ | ~ |
| ~ | | ~ | $ ~ | | | | | |
| ~ | | ~ | $ ~ | | | | | |
| ~ | | ~ | $ ~ | | | | | |

FIG. 2

MACHINE READABLE DOCUMENT

RELATED APPLICATIONS FOR PATENT

This application is a continuation-in-part of application Ser. No. 06/552,859 filed Nov. 17, 1983, which is a continuation-in-part of application Ser. No. 06/277,015, filed June 24, 1981, now abandoned.

BACKGROUND OF THE INVENTION

The present invention relates to machine readable documents and a method for processing such documents such that unknown variable data of a specified character in an unknown, variable location on each document can be machine located, accurately read, and identified as to type for creating a composite record. In one specific embodiment the invention relates to a negotiable instrument or bank check and method of check processing for producing a composite selective image statement.

In the processing of documents, representative of commercial transactions, particularly negotiable instruments or checks, it has heretofore been necessary to run the documents through a number of separate and distinct processes in order to classify and sort the documents and glean from them all necessary information. For example, in the case of checks, the checks are first processed through a proof of deposit machine, where the checks are magnetically encoded with all pertinent information. The proof encoder system further utilizes a high speed magnetic character recognition reader and sorter to sort the checks into a variety of categories.

Subsequently, the checks are further sorted into even more categories and the checks written on the bank doing the processing (ON-US checks) are filed in a separate place. While the above process has been relatively accurate, it has been quite labor intensive and time consuming.

In a similar manner, insurance forms, credit card records, inventory lists and numerous other form documents of various kinds and description typically include "free" areas or blank zones at appropriate locations to receive handwritten indicia in the normal flow or cycle of document use. A substantial difficulty exists, however, when attempts are made to machine read a large volume of such documents and process the document for hand written matter in that the free areas or zones are positioned at unknown, variable locations on the documents and machine reading for added matter in the past has dictated whole document scanning. Whole document scanning, however, requires a large digital storage capacity which is prohibitively expensive for most applications.

In addition to the above, forms often are designed with background matter such as a regular pattern or a picture, for example, on a personal check. When such matter is encountered in a zone to be machine read the background data or picture received by the machine reader can obscure and render unintelligible to an optical character reader the hand written data which is to be accurately read.

Additionally, even if handwritten data could somehow be identified at various locations on a plurality of document formats and machine read, notwithstanding any background patterns, it is still necessary to differentiate the category or type of data being read such as the numerical amount, signature of a check, etc. so that a composite statement can be generated.

Not only would it be desirable to obviate or minimize problems of the type describe above, it would be highly desirable to provide machine readable documents and a process for automatically reading the documents wherein a conventional size and style of the documents could be maintained such that user familiarity and acceptance would not be sacrificed.

The difficulties and limitations suggested in the preceding and other difficulties encountered with previously known machine readable documents and techniques have rendered previously known systems unacceptable and substantially useless to industries involved with a high volume of document processing. As a consequence, it is believed that all such documents continue to be laboriously hand processed, often several times, in a labor intensive manner to accurately record all needed data.

OBJECTS OF THE INVENTION

It is a general object of the invention to provide a novel machine readable document and process which will obviate or minimize problems of the type previously described.

It is a particular object of the invention to provide a novel machine readable document and process wherein variable data at an unknown location on the document may be reliably machine located on the document.

It is a related object of the invention to provide a novel machine readable document and process wherein variable data, once located on a document, may be accurately classified as to type.

It is a further related object of the invention to provide a novel machine readable document and process wherein variable data, once located on a document and classified as to type, may be accurately read and digitized notwithstanding the presence of background patterns or pictures of an unlimited and unknown variety.

A specific object of the present invention is the provision of a novel machine readable negotiable instrument and method for machine reading, processing and automatically preparing a checking statement of account.

It is another specific object of the invention to provide a negotiable instrument wherein handwritten information areas on the check of any size, shape, or color can be facilely and accurately machine-scanned, read, and processed for payee, amount, maker information and/or other valuable data at unknown locations on the negotiable instrument.

SUMMARY OF THE INVENTION

One specific embodiment of the present invention relates to a check to be used in apparatus for processing documents containing both hand-written and encoded characters indicative of a commercial transaction. The apparatus includes (1) means for receiving the documents, (2) character recognition means adapted to scan encoded characters that produce recognition signals corresponding to each of the documents and indicative of the encoded characters, (3) scanning means for scanning pre-selected but unknown handwritten portions of the documents and developing information signals therefrom, and (4) control means responsive to the recognition signals and the information signals to store a particular one of said documents in one of a plurality of preselected pockets in response to the information contained in the output signal corresponding to the document and to store the information contained in the recognition signals and the information signals on an output medium.

A check is conventionally designed so that a maker's signature appears within a first horizontal band area on the check and the written payee and numerical amount appear within a second and third horizontal band area on the check, respectively. In accordance with a preferred embodiment of the invention, fluorescent or phosphorescent ink is applied as background on the horizontal band areas and operably trips the scanning means when subjected to ultraviolet light. Once tripped, the scanner reads only the preselected portions of the check, namely the band areas.

The scanner includes an ultraviolet source of light which illuminates only the background of the subject areas and, thus, any writing within the areas and on top of the ink sharply contrasts with the fluorescent or phosphorescent background ink to permit the handwritten matter within the band areas to develop information signals corresponding only to the handwritten portion of the check. The image data obtained via the information signals from the scanner and the recognition data obtained via the recognition signals from the optical reader relative to the ON-US checks only are cycle-sorted onto the storage media. At cycle time the accumulated files are re-entered to a random access device and are sorted by account number sequence and by check sequence number within accounts. The structured files are then merged with a master file and a history file to generate a statement file. A statement generator produces a statement containing at least the written payee and written numerical amount information which the maker can check against his check stubs. The statement can also include the maker's signature or other data from the check as desired.

In a similar manner variable data at an unknown location on a variety of other form documents may be facilely machine located, read, digitized and compiled into a summary or composite statement.

BRIEF DESCRIPTION OF THE DRAWINGS

FIG. 2 is illustrative of part of a typical output statement of the apparatus of FIG. 1.

DETAILED DESCRIPTION

Context of the Invention

Figure 1:
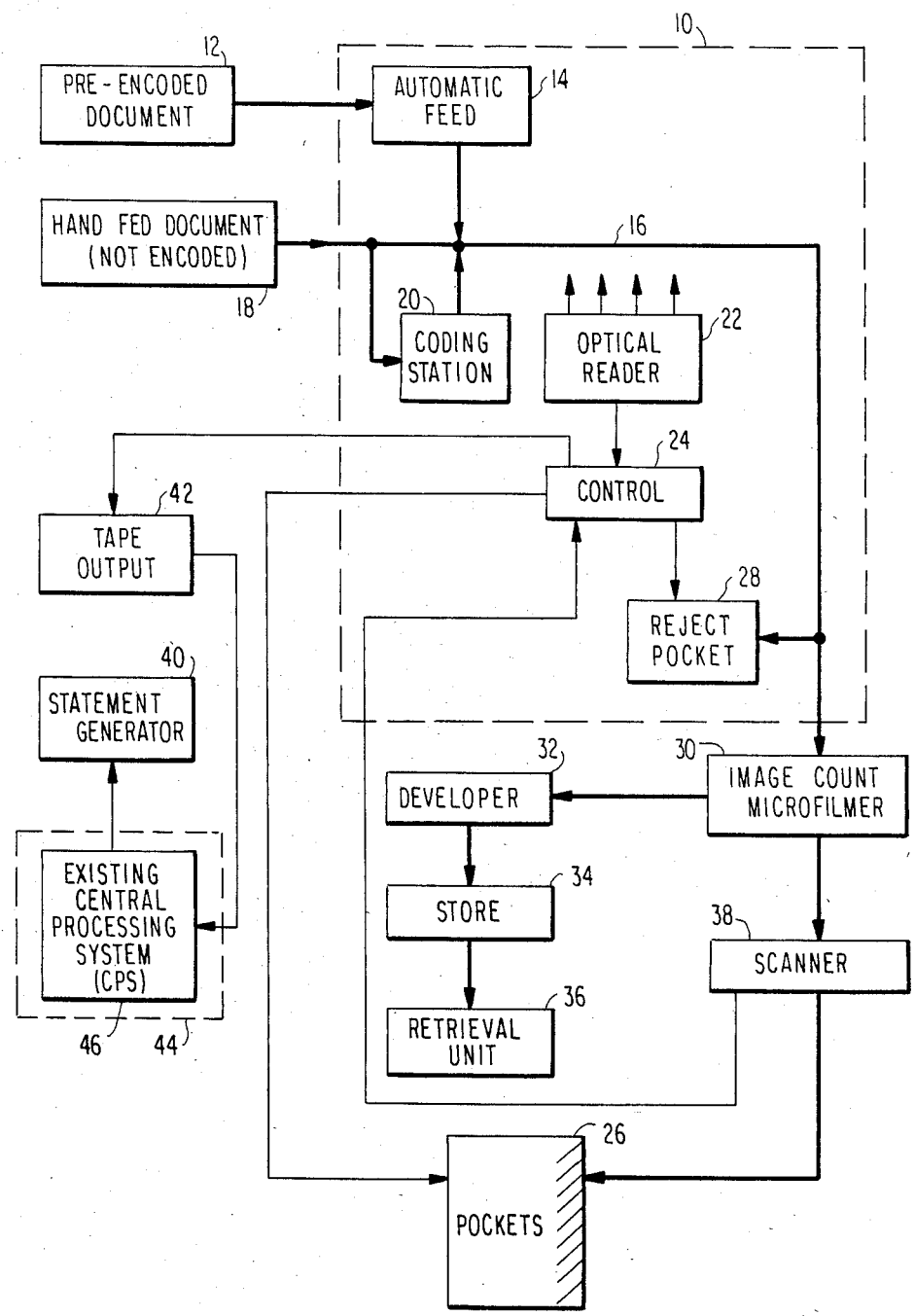
FIG. 1 shows a block diagram of a document processing apparatus operable for machine processing a negotiable instrument or other form document for hand entered data in accordance with the present invention.

A document processing apparatus operable to use the present invention will now be described with reference to the blocked diagram shown in FIG. 1. A standard proof and coding system, is indicated by dotted line 10. All units shown within the dotted line are typically part of the proof encoder system 10. While all the units shown outside the dotted line are not conventionally part of the proof encoder system 10 (with the exception of the pockets 26 and CPS system 46).

All pre-encoded documents 12 are placed in an automatic feed 14 where they are delivered into the document transport path 16. Such pre-encoded documents includes checks having such items as the bank ID number, the account number, the check sequence number, and the amount already encoded along the bottom edge of the document. For example, many travelers checks and business checks are so pre-encoded.

Documents 18 which have not been encoded are hand fed to the coding station 20. Such documents as personal checks, on which the amount must be encoded at the bank after receipt, are encoded at coding station 20 and thereafter delivered to the document transport 16. The document transport 16 carries the documents past a character recognition means 22. The character recognition means is preferably an optical reader designed to read a Farrington 7B Font. Also, an optical MICR (Magnetic Ink Character Recognition) or a magnetic MICR read head can be employed. Other fonts can also be handled.

The optical reader 22 scans the encoded characters on the document and produces visual recognition signals corresponding to each of the documents indicative of the encoded characters. These recognition signals are transmitted to a control 24. The control 24 is preferably a digital computer. The control 24 sends a signal responsive to the recognition signals to a sorter 26. The sorter 26 contains a plurality of pockets in which documents may be stored according to pre-selected criteria. The control 24 also sends a signal to a reject pocket 28 if the recognition signals corresponding to a particular document indicate non-recognition.

Continuing along the document transport path 16, if the document passes the reject pocket 28, it will next be processed through a copy means 30. The copy means 30 is preferably an image count microfilmer. The microfilmer 30 creates a permanent copy of the front and rear of all documents passing through the microfilmer. The copies are then processed in a know fashion in a developer 32 and stored at 34. Whenever needed, these copies may be retrieved in a known manner through the use of a microfilm retriever 36. The documents are then transported past a scanning means 38, which is preferably a solid state, line scan camera.

The scanner 38 scans the document and develops digital information signals therefrom. These information signals are transmitted to the control 24. For example, on a check, the scanner would scan the handwritten portion of the "Pay to the Order of" line the signature line and the "Amount" area and, if desired, other zones of the check document. The documents are then transported to the sorter 26 where they are stored in preselected pockets, as discussed earlier. The control 24 stores the information contained in the recognition signals from the optical reader 22 and the information signals received from the scanner 38 on an output medium. The output medium may be magnetic tape 42 or cassette or disc. This output record is delivered to the existing central processing system 46 (CPS). The image data obtained via the information signals from the scanner 38 and the recognition data obtained via the recognitions signals from the optical reader 22, relative to the ON-US checks only, are cycle-sorted onto the storage media. At cycle time, the accumulated files are re-entered to a random access device and are sorted by account number sequence and by check sequence number within accounts. The structured files are then merged with a master file and a history file to generate a statement file. This entire function takes place within the CPS, which is denoted as already existing within the user system by dotted lines 44. A statement generator 40 receives an output from the CPS 44 to create both of microfilm image and a hard copy statement of the account. The statement generator 40 can be one of a number of know prior art devices classified as computer output microfilmers and film-to-paper devices.

Thus, in practice the operator of the proof encoder system 10 need make no changes in the normal system operating procedures. The proof encoder system, when modified by the document processing apparatus of the present invention, now accomplishes the following functions in addition to the prior proofing process:

(1) The system captures from all ON-US checks: the account number, the check sequence number, the handwritten—or otherwise produced—"Pay to the Order of" line, numeric dollar amount field, and the signature,
(2) It is possible to sort out the stop pays, no posts, and overdrafts;
(3) Checks other than the ON-US checks may be sorted by whatever criteria the bank chooses;
(4) The use of an automatic feed makes it feasible to run several passes on the not ON-US checks for multiple end point distribution;
(5) All rejected items may be immediately re-entered by the operator.

As a result of the above capabilities, the need for high-speed MICR reader/sorters, the fine sort operation, the filing of ON-US checks—and the resultant time delays caused thereby—are eliminated.

FIG. 2 illustrates an example of the type of hard copy statement 50 which may be printed by the statement generator 40. The relevant fields to note are the "Pay to the Order of" field 52 and the "Amount" field 54. Since these fields are generated in response to information received from the scanner 38 and, therefore, accurately depict the handwritten portions of the processed checks, it eliminates the need for the account holder to store cancelled checks, and further eliminates the need for the bank to gather all file checks and combine them with the proper statements.

Negotiable Instrument

Figure 3:
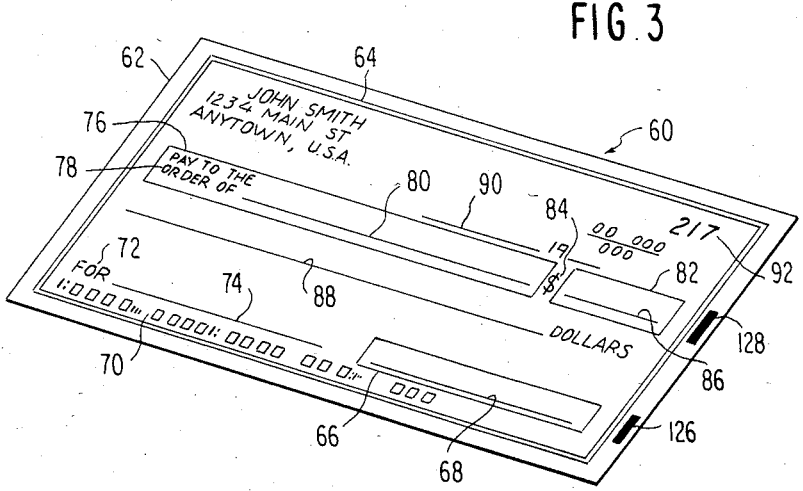
FIG. 3 is an axometric view of a negotiable instrument in accordance with a specific embodiment of the invention.

Referring now to FIG. 3, there is seen one preferred type of document to be machine scanned, read and data identified in accordance with the invention. More specifically a negotiable instrument or check 60 is shown wherein the check has an edge 62 which may be straight or attached to a stub, as by perforations (not shown) or the like. An optional border 64 extends around the check inwardly of the edge, to leave a peripheral space therearound.

A first blank area or field 66 of generally rectangular configuration has within it a "signature" line 68 on which the maker of the check signs his name.

The usual series of magnetically or optically readable bank and account numbers 70 are found in the lower left-hand corner of the check. A "FOR" notation 72 and line 74 are placed immediately above the bank numbers 70.

A second blank area or field 76 is located above blank area 66 and has a "PAY TO THE ORDER OF" notation 78 and accompanying payee line 80. A third blank area or field 82 is located adjacent the dollar sign 84 and includes line 86 in which the maker enters the numerical value of the check and writes the same value in script on line 88. A date line is provided as at 90 and the check number is at 92.

The check may be printed on white check paper, but more frequently a color or lined background ink is applied to the entire face of the check. Moreover, on many personal checks various background pictures are frequently printed onto the check document.

In a preferred embodiment a fluorescent ink which is invisible to the naked eye under conventional light is applied on top of the conventional check color, line pattern or picture ink as a background for areas to be machine read such as zones 66, 76, and 82 where indicia to be machine read will be entered. Upon deposit of such fluorescent ink fields, the check will appear entirely conventional to users and bank customers in conventional light. When the document is passed under ultraviolet light, however, the entire check will be black with the exception of the fluorescent background areas or zones. Any written indicia within the zone which has been added on top of the fluorescent ink, however, will be black by comparison with the fluorescent background area and thus will be in distinct contrast to the background. This sharp contrast enables the written inidicia to be machine scanned, read and digitized notwithstanding various ink patterns that may exist and be seen on the check document in conventional light. The fluorescent background thus enables a reader to be actuated or tripped to read only the fluorescent zones and also provides a sharp contrast with anything handwritten or typed on top of the fluorescent background for facile, accurate digitizing. The foregoing fluorescence, by use of an ultraviolet source light, and digital reading will be performed within the scanning apparatus.

In a preferred embodiment the fluorescent ink has an emission spectrum, when exposed to ultraviolet light, which peaks at about 544 nanometers (yellow to the eye). This fluorescent ink, like all fluorescent inks, is essentially transparent and invisible in a normal light environment and only becomes visible when exposed to ultraviolet light. Such an ink is commercially available under the designation A-716A from Ultra-Violet Products, Inc. of San Gabriel, Calif. A scanner which has been found to be particularly effective for this ink is designated RL512C and is available through EG&G Reticon of Sunnyvale, Calif.

In addition to fluorescent ink it has been determined that phosphorescent ink may also be utilized such as zinc orthosilicate in a binder. This ink is substantially invisible under conventional light but will luminesce in the presence of radiation or ultraviolet light and for a period following removal from the ultraviolet light.

In a manner similar to the above, other background inks are within the purview of the instant invention provided that such inks are invisible or substantially invisible to the unaided eye in normal light but may be made to exhibit a background field in contrast to non-treated zones of a document when presented to a compatible reader, using ultraviolet light or some other source of radiation, electronic or magnetic energy as appropriate to bathe the document.

Figure 4:
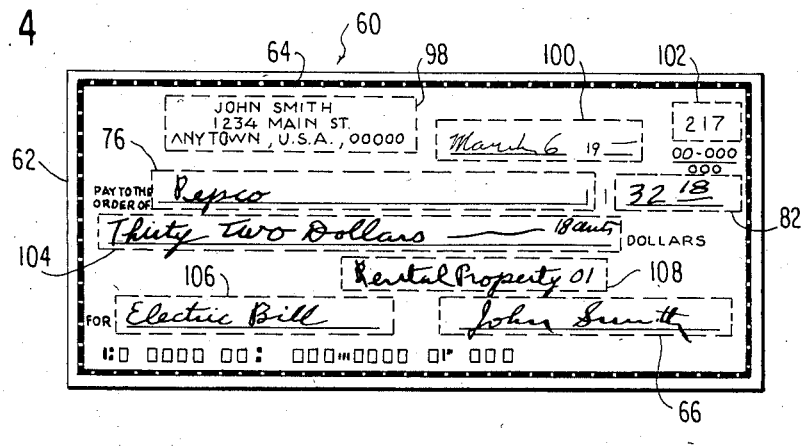
FIG. 4 is a plain view of a negotiable instrument as shown in FIG. 3 wherein designated areas or zones on the check have been identified by phantom lines.

In addition to the primary zones of interest on a check document comprising the signature field 66, payee field 76 and numeric amount field 82, other areas of a check may be made to admit to accurate machine scanning and reading. In this connection FIG. 4 is a plain view of a check which has been divided by phantom lines into a plurality of zones of interest such as account holder 98, date of making 100, check number 102, written amount number 104, a "FOR" designation 106 and a special designation field 108. Other areas could also be designated, as desired, but in each instance the zone of interest is to receive a background of fluorescent, phosphorescent ink, or other ink which is substantially invisible to the unaided eye in normal light but which may be excited within a compatible scanner to a condition in distinct contrast to the rest of the document and any matter added on top of the background ink or film.

Figure 5:
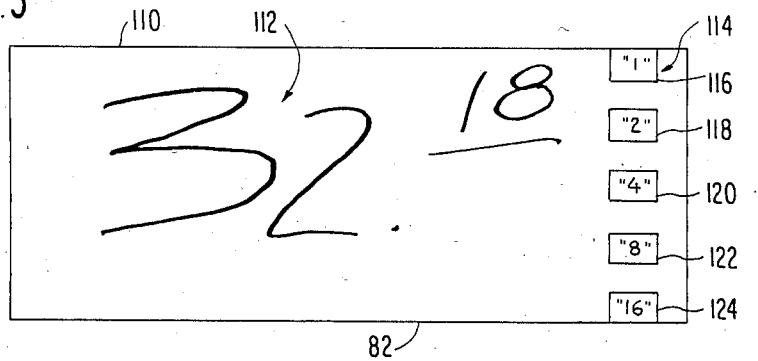
FIG. 5 is an enlarged detail view of one of the designated areas on zones on the check depicted in FIG. 4.

The foregoing provides a facile means for identifying specific areas of a document to be machine read, for blanking out all data on the document except the matter to be machine read and for providing a contrasting background to facilitate accurate machine reading and digitizing of matter within the zones of interest. In addition to the above, however, the subject invention contemplates an identification of the specific character or type of information contained within each zone of interest. In this regard, and by way of illustration, an enlargement of the amount field 82 from FIG. 4 is depicted in FIG. 5. The background area 110 of field 82 has been coated with a normally invisible ink or coating composition, as detailed above, and the maker has added a numerical amount of a check in script 112 on top of the invisible coating at the time of making the check. Since the location of field 82 may vary from check-to-check (document-to-document), the location of field 82 on any given check is unknown. Accordingly it would be highly desirable to be able to identify the type of field being scanned during the field scanning operation. In a preferred embodiment of the invention this field identification function can be achieved by a binary code 114 built into the film or coating 110.

The binary code 114 is preferably established by selectively depositing the normally invisible ink or coating within a column of generally rectangular subzones 116–124 along the right hand edge of the field 82. As indicated in FIG. 5, if only an initial subzone 116 is uncoated a value of one ("1") can be assigned to this field and one field can be characterized as to the class of indicia within the field. (A coated condition is not used at as an indicator because coating within the field is the norm and it would therefore not be possible to determine if a signal were intended.) If the second subzone is uncoated then a value of two ("2") can be assigned to this zone and three fields can be identified as to subject matter on any one document. If three subzones 116, 118, and 120 are used (by uncoating) and zone 120 is assigned the value four ("4") then seven ("7") fields of subject matter can be identified and if four the zone 122 is assigned the value eight ("8") and if five, zone 124 is assigned the value sixteen ("16"). When all five zones are utilized the number of combinations is thirty-one, etc. In addition to the use of a binary code other coding may be utilized such as universal product code, OCR-A, OCR-B, etc. In some instances where appearance is not critical binary or universal code may even be printed with normally visible or magnetic ink on top of the normally invisible background coating.

In some instances it may be acceptable for the field identifying indicia to be located in a position remote but logically associated with the field of interest to be read. In this regard, and referring again to FIG. 3, if a signature field and numeric amount field are the only fields to be read, then indicia zones 126 and 128 respectively may be positioned in a margin portion of the check horizontally offset from the fields of interest. The actual indicia used in the margin areas may be a variety of types such as visible bar code, notches, holes, magnetic ink, or even an invisible ink of the type discussed above.

The foregoing discussion has been with respect to one form of document which is suitable to advantageously utilize the instant invention of machine locating a field of interest at an unknown location on a document; accurately machine reading indicia within the field, notwithstanding normally visible background pictures or patterns; and identifying the indicia by class with respect to other classes of indicia on the same document. An ability to machine read negotiable instruments or checks is a tremendous labor saving advantage to the banking community. In addition, however, the instant invention also has desirable application in the credit card industry, for handling, reading and preparing credit card statements, in the insurance industry, in machine scanning forms for desired information, and in any industry where it would be advantageous to be able to machine locate data at an unknown location on a document of varying size; identify the data by class and accurately machine read the data notwithstanding a varying visual background.

In brief summary the subject invention comprises a document having zones of interest coated with an ink which is substantially invisible to the unaided eye in natural light. Such zones operably receive hand or typewritten indicia to be later read. Since the ink or coating is invisible under normal lighting conditions application of this ink or coating will not impair the underlying pattern or text of the printed document. Upon illumination by ultraviolet light, radiation or other source of energy during automatic processing, however, the field areas emit a solid background signal to a scanner and any indicia placed on top of such treated field areas will be readily discernible by the scanner because the indicia, in conventional ink, will not create as strong a signal, if any, as the background area. The class of the indicia read can be identified by coding associated with each zone of interest to be machine read.

A control computer stores the information contained in the recognition signals received from an optical reader and the information signals received from the scanner on an output medium which may be magnetic tape, cassette, or disc. The image data obtained via the recognition signals from the scanner and the recognition data obtained via the recognition signals from the optical reader are cycle-sorted onto a storage medium. At cycle time, the accumulated files are re-entered to a random access device and are sorted by account number sequence and by sequence number within accounts. The structured files are then merged with a master file and a history file to generate a statement file. A statement generator receives an output from the existing CPS to create both a microfilm image and a hard copy statement of the account. The statement generator is one of a number of known prior art devices classified as computer output microfilmers and film-to-paper devices.

Thus, in practice, the operator of a proof encoder system need make no changes in the normal system operating procedures.

The document processing apparatus accomplishes the following functions for a negotiable instrument, in addition to the prior proofing process when the instant document is employed:

(1) The system captures from all ON-US checks or specified documents: the account number, the check sequence number, the handwritten—or otherwise produced—"Pay to the Order of" line, numeric dollar amount fields, and the signature;

(2) It is possible to sort out the stop pays, no posts, and overdrafts;

(3) Checks other than the ON-US checks may be sorted by whatever criteria a bank chooses;

(4) The use of an automatic feed makes it feasible to run several passes on the not ON-US checks; for multiple end point distribution;

(5) All rejected items may be immediately re-entered by the operator.

As a result of the above capabilities, the need for high-speed MICR reader/sorters, the fine sort operation, the filing of ON-US checks—and the resultant time delays caused thereby—are substantially eliminated.

In describing the invention, reference has been made to preferred embodiments and illustrative advantages of the present invention. Those skilled in the art, however, and familiar with the instant disclosure of the subject invention may recognize additions, deletions, modifications, substitutions and/or other changes without departing from the scope of the instant invention and appended claims.

I claim:

1. A negotiable instrument operable for automatic bank scanning and processing comprising:

a planer member of generally rectangular configuration and having a width and height and bank identification information and an area for receiving a date of making of the negotiable instrument on one side thereof, said planer member further having a first field area on said one side for receiving indicia within said first field area designating a maker of the negotiable instrument, said planer member having a second field area on said one side for receiving indicia within said second field area designating a payee of the negotiable instrument and said planer member having a third area on said one side for receiving a numeric amount of said negotiable instrument;

coating means applied as a background upon said negotiable instrument within at least one of said first, second, and third field areas, said coating means being substantially invisible to the human eye under normal lighting conditions and being operable for receiving indicia placed within said at least one of said first, second, and third field areas and upon said coating means background, said coating means being further operable for selectively permitting a scanner to read the said at least one of said first, second, and third field areas of the negotiable instrument and for optically rendering indicia placed upon the coating means background readable by a scanning apparatus directing energy onto said negotiable instrument; and code means corresponding to said at least one of said first, second and third field areas receiving said coating means and being operable for identifying the character of the information placed on top of said coating means wherein information located within said at least one of said first, second, and third field areas, regardless of location on the negotiable instrument, may be automatically detected, scanned and machine read.

2. A negotiable instrument operable for automatic bank scanning and processing as defined in claim 1 wherein said coating means comprises:
a fluorescent ink.

3. A negotiable instrument operable for automatic bank scanning and processing as defined in claim 2 wherein:
said fluorescent ink has an emission spectrum when exposed to ultraviolet light which pass at approximately 544 nanometers.

4. A negotiable instrument operable for automatic bank scanning and processing as defined in claim 1 wherein said coating means comprises:
a phosphorescent ink.

5. A negotiable instrument operable for automatic bank scanning and processing as defined in claim 1 wherein said code means comprises:
a binary code array of subzones within said at least one of said first, second and third field areas wherein application of machine readable coating or non-coating is used to create a binary code indicative of the character of the field area upon application of energy within the scanning apparatus.

6. A negotiable instrument operable for automatic bank scanning and processing as defined in claim 5 wherein said binary code means comprises:
a column of subzones positioned along the right hand margin of said at least one field and being formed by the presence or absence of coating means within the subzones.

7. A negotiable instrument operable for automatic bank scanning and processing as defined in claim 6 wherein said subzones comprise:
a column of five rectangular areas along the right hand margin of said at least one field area.

8. A document operable for automatic machine scanning and processing comprising:

a planer member of generally rectangular configuration having a width and height and printed indicia on at least one surface thereof, said one surface, in addition to said print indicia, having a first field area on said one surface for receiving variable indicia within said first field area, said planer member having at least a second field area on said one surface for receiving variable indicia within said at least a second field area distinguishable from the variable indicia within said first field area;

coating means applied as a background upon said document within at least one of said first and at least a second field area, said coating means being substantially invisible to the human eye under normal lighting conditions and being operable for receiving indicia placed within said at least one of said first and at least a second, field area and upon said coating means background, said coating means being further operable for selectively permitting a scanner to read the said first and at least a second, field area of the document and for optically rendering indicia placed upon the coating means background readable by a scanning apparatus directing energy onto said document; and code means corresponding to at least one of said first and at least a second field area receiving said coating means and being operable for identifying the character of the information to be placed on top of said coating means, wherein information located within said at least one of said first and at least a second field area, regardless of location on the document may be automatically detected, scanned and machine read.

9. A document operable for automatic machine scanning and processing as defined in claim 8 wherein:
said coating means comprises a fluorescent ink.

10. A document operable for automatic machine scanning and processing as defined in claim 8 wherein:
said coating means comprises a phosphorescent ink.

11. A document operable for automatic machine scanning and processing as defined in claim 9 or 10 wherein:
said energy comprises ultraviolet light.

12. A negotiable instrument operable for automatic bank scanning and processing as defined in claim 8 wherein said code means comprises:
a binary code array of subzones within said at least one of said first and at least a second field area wherein application of machine readable coating or non-coating is used to create a binary code indicative of the character of the field area upon application of energy within the scanning apparatus.

13. A negotiable instrument operable for automatic bank scanning and processing as defined in claim 12 wherein said binary code means comprises:
a column of subzones positioned along the right hand margin of said at least one field and being formed by the presence or absence of coating means within the subzones.

* * * * *